(12) United States Patent
Panje et al.

(10) Patent No.: US 11,240,734 B2
(45) Date of Patent: Feb. 1, 2022

(54) UTILIZING BLACKLIST STEERING TO PREVENT REJECTION OF BSS TRANSITION MANAGEMENT (BTM) STEERING

(71) Applicant: ARRIS Enterprises LLC, Suwanee, GA (US)

(72) Inventors: Krishna Prasad Panje, Bangalore (IN); Anil Kumar Nellore, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 16/985,541

(22) Filed: Aug. 5, 2020

(65) Prior Publication Data

US 2021/0045040 A1    Feb. 11, 2021

Related U.S. Application Data

(60) Provisional application No. 62/882,649, filed on Aug. 5, 2019.

(51) Int. Cl.
*H04W 48/06* (2009.01)
*H04W 36/08* (2009.01)
*H04W 36/38* (2009.01)
*H04W 36/00* (2009.01)

(52) U.S. Cl.
CPC ....... *H04W 48/06* (2013.01); *H04W 36/0061* (2013.01); *H04W 36/00835* (2018.08); *H04W 36/08* (2013.01); *H04W 36/38* (2013.01)

(58) Field of Classification Search
CPC . H04W 84/12; H04W 36/08; H04W 36/0061; H04W 36/00835; H04W 36/38
See application file for complete search history.

(56) References Cited

U.S. PATENT DOCUMENTS

| | | | |
|---|---|---|---|
| 2011/0171933 A1* | 7/2011 | Liu | H04W 8/186 455/411 |
| 2018/0352497 A1* | 12/2018 | Taskin | H04W 36/08 |

* cited by examiner

*Primary Examiner* — Jamal Javaid
(74) *Attorney, Agent, or Firm* — Wenderoth, Lind & Ponack, L.L.P.

(57) ABSTRACT

Wireless devices (clients) connect to different access points (AP) in a wireless network. The wireless network may determine that based on, for example, congestion of certain APs that a client should be steered away from a current AP. Steering may be conducted utilizing BSS transition management (BTM) messages to provide the client with a list of network-preferred APs for a transition. Clients may also have one or more preferred APs and may reject the BTM steering message if it does not include at least one client-preferred AP. To prevent rejection of the BTM message, at least one client-preferred AP may be added to the BTM message. To ensure the client is steered to a network-preferred AP, the client is blacklisted from connecting to the client-preferred AP until the client has been steered to a network-preferred AP.

20 Claims, 6 Drawing Sheets

UTILIZING BLACKLIST STEERING TO PREVENT REJECTION OF BSS TRANSITION MANAGEMENT (BTM) STEERING

BACKGROUND

More and more devices are capable of communicating wirelessly and the functionality available on wireless devices continues to increase. Wireless communications may be between wireless devices and/or with the Internet. The wireless communications between wireless devices may be accomplished using one or more wireless protocols. For example, wireless devices may communicate directly with one another using Bluetooth (IEEE 802.15.1). Alternatively, wireless devices may communicate with each other or with the Internet via a wireless local area network, such as Wi-Fi (IEEE 802.11). To communicate via a Wi-Fi network, the Wi-Fi devices may directly connect to the Wi-Fi network via an access point (e.g., router). Bluetooth devices may connect to the Wi-Fi network utilizing a Bluetooth-Wi-Fi bridge.

The wireless devices may be capable of connecting to the Internet and accessing various networks, systems and/or content either via the Internet or a direct connection (e.g., secure link). The wireless devices may connect to the Internet either via a mobile network or via a local area network providing wireless communications, often referred to as a wireless network or a Wi-Fi network. The Wi-Fi network is typically connected to a broadband network and the broadband network connects to the Internet and may be capable of providing a secure link to other networks, systems and/or content.

Figure 1:
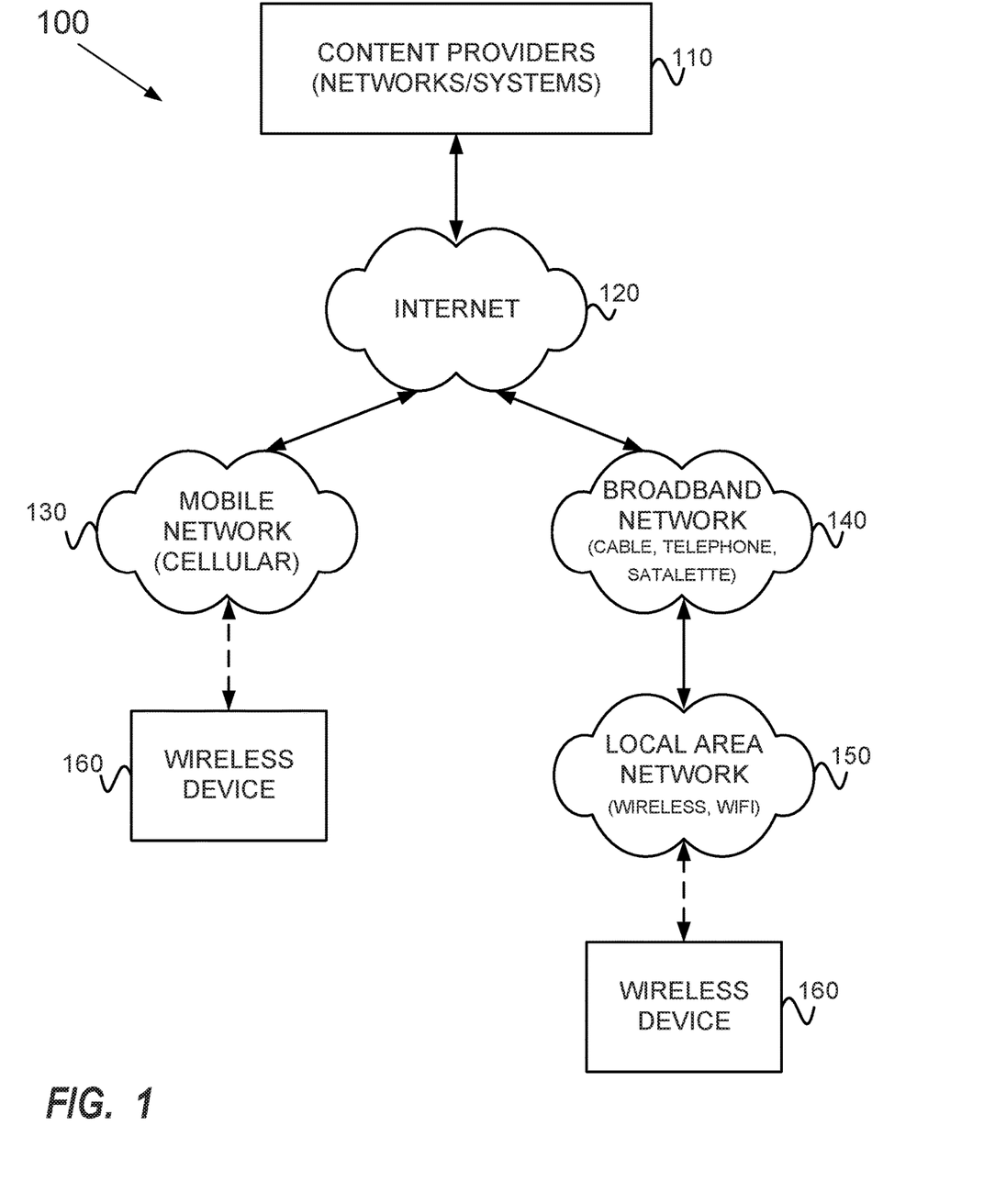
FIG. 1 illustrates an example system diagram showing wireless devices connecting to the Internet as well as networks, systems and/or content providers connected thereto.

FIG. 1 illustrates an example system diagram 100 showing wireless devices 160 connecting to the Internet 120 as well as, for example, networks, systems, webpages and/or content providers (simply referred to as content providers for ease of discussion) 110 that are also connected to the Internet 120. The wireless devices 160 may connect to the Internet 120 and access content from the content providers 110 via a mobile network 130, such as a cellular network provided by any of the cellular carriers. The wireless devices 160 may also connect to the Internet 120 and access content from the content providers 110 via a broadband delivery network (wide area network) 140. The delivery network 140 may be, for example, a cable network, a telephony network, or a satellite network. The wireless devices 160 may connect to the delivery network 140 via a wireless local area network 150, such as a Wi-Fi network, that is connected to the delivery network 140. Non-wireless devices (e.g., desktop computers) may also connect to the Wi-Fi network 150.

The wireless devices (Bluetooth and/or Wi-Fi) include devices that typically remain in same location (stationary devices) and devices that are typically changing locations with a user (mobile devices). The stationary devices may include, but are not limited to, televisions, appliances, entertainment systems, door locks, and security cameras. The mobile devices may include, but are not limited to, computers, tablets, phones, watches (e.g., Apple® watch), activity trackers (e.g., Fitbit®), electronic-readers (e.g., Kindle®), remote controls, headphones, toys and remote starters.

With the increase in the number and type of wireless devices that are in use every day comes a need for an increase in performance (e.g., speed, bandwidth, range) of wireless (e.g., Wi-Fi) networks. Increased speed may be necessary to handle the increasing capabilities of many of these devices, such as ultra-high definition video. Increased bandwidth may be required to handle the increased number of devices that are likely accessing the Wi-Fi network. Increased range is required as the wireless devices are likely located at varying distances from an access point for the Wi-Fi network so the Wi-Fi network needs to be able to communicate further distances.

Higher speed Wi-Fi networks such as those operating at 5 GHz (5G networks) have been deployed. However, many Wi-Fi devices are still designed for lower speed networks such as those operating at 2.4 GHz (2.4G networks). Accordingly, it is often the case where Wi-Fi networks are designed to operate at multiple frequencies (e.g., 2.4G and 5G). A Wi-Fi network may include a modem to connect to a broadband network (e.g., cable network, telco network, satellite network) provided by a service provider and a Wi-Fi router to provide a Wi-Fi access point to the broadband network. The Wi-Fi router may include multiple antennas (e.g., 2.4G and 5G) so they can operate at multiple frequencies. The modem and Wi-Fi router may be combined in a single device (e.g., gateway).

Furthermore, the Wi-Fi network may utilize access points (e.g., extenders, routers, bridges, repeaters) in order to expand the bandwidth and range of the Wi-Fi networks to areas that may not be capable of receiving a Wi-Fi signal from the gateway (main access point). The access points may provide the ability to connect to one or more of the Wi-Fi networks (e.g., 2.4G, 5G) provided by the gateway by transmitting the Wi-Fi signal from the location of the network extender. The access points may communicate with the gateway via a wired (e.g., home electrical wiring, coaxial cable, Ethernet cable) connection or a Wi-Fi connection.

Figure 2:
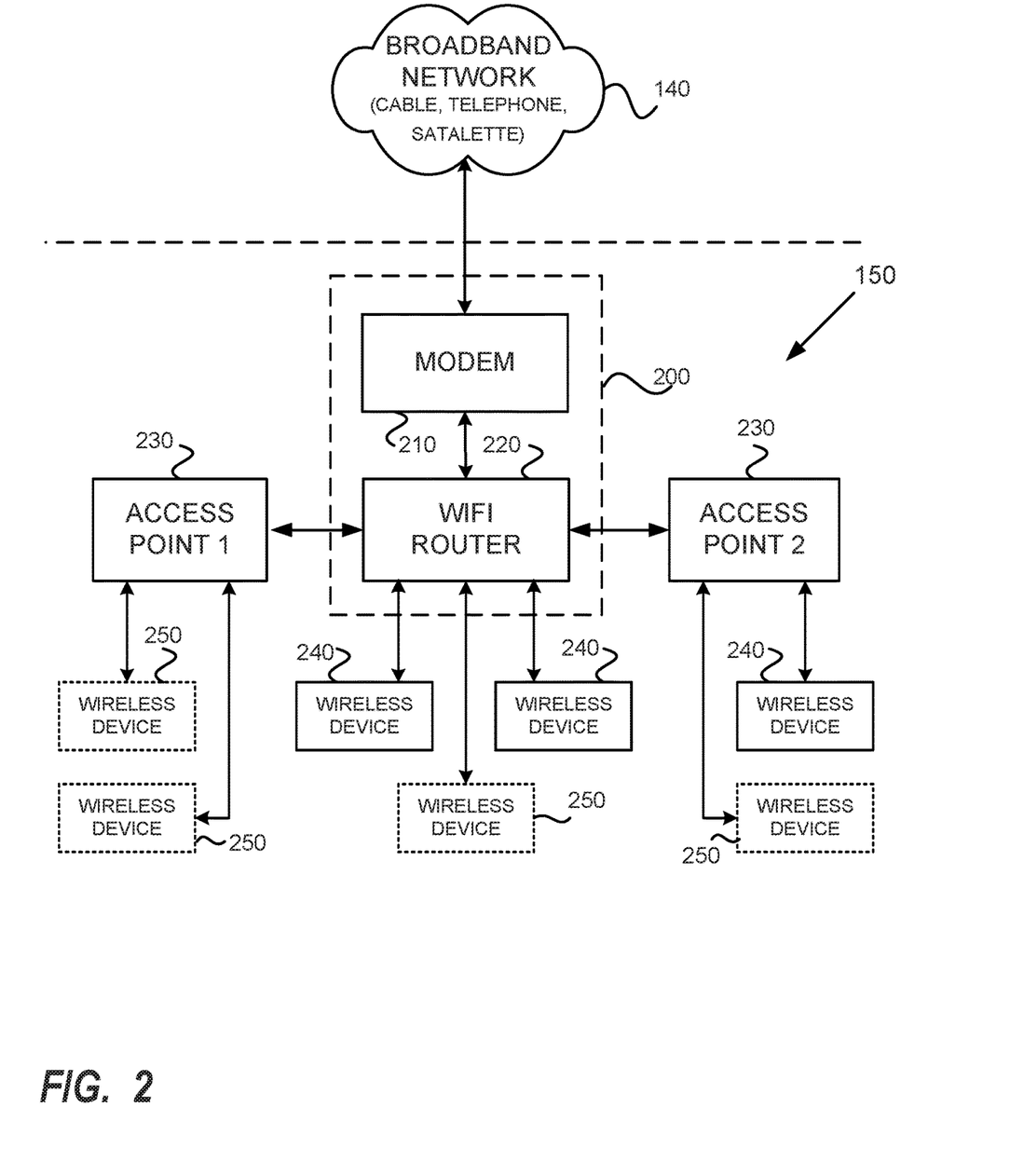
FIG. 2 illustrates an example high level system diagram of a Wi-Fi network within a location.

FIG. 2 illustrates an example high level system diagram of a Wi-Fi network 150. The Wi-Fi network 150 may include a modem 210, a Wi-Fi router 220 and one or more access points (e.g., extenders) 230. The modem 210 is for communicating with a broadband network 140. The Wi-Fi router 220 is connected to the modem 210 to provide a link between the Wi-Fi network 150 and the broadband network 140. The Wi-Fi router 120 may include one or more antennas to transmit and receive Wi-Fi signals to enable communications with wireless devices 150.

The location of the router 220 should be in close proximity to the modem 210. According to one embodiment, the modem 210 and the router 220 may be combined into a single component (e.g., gateway) 200. The modem 110 and the router 120 may be located in a central part of the location and/or an area where most wireless traffic is expected. For example, the modem 210 and the router 220 may be located on the main floor in a residence or may be located in a home office.

As the Wi-Fi router 220 may not be capable of communicating with wireless devices that are too far away, the access points 230 may be located at points remote from the Wi-Fi router 220 to provide for additional Wi-Fi communications with additional wireless devices. The access points 230 may be located at locations where the Wi-Fi signal from the router 220 may not be strong, where sufficient Wi-Fi traffic is expected, or where a high quality Wi-Fi signal is desired or required. For example, an access point 230 may be located on different floors from the router 220 or in a home office or an entertainment room where connectivity is important. The access points 230 may provide a subset or all of the frequency bands of the Wi-Fi router 220.

The wireless devices connected to the router 220 or the access points 230 may be stationary devices 240 or may be mobile devices 250. The wireless devices 240, 250 may be connected to the access point (e.g., router 220, extender 230)

that has the strongest signal strength. As illustrated, the router 220 is connected to two stationary wireless devices 240 and one mobile wireless device 250, a first access points 230 (access point 1) is connected to two mobile wireless devices 250, and a second access points 230 (access point 2) is connected to one stationary wireless devices 240 and one mobile wireless device 250. The configuration of the wireless network 150 is not limited to any specific location for the router 220, any number or location of the access points 230, any number of wireless devices 240, 250 being connected to the Wi-Fi network 150 or any wireless device connection topology. In fact, the number and access point connectivity configuration of the wireless devices 240, 250 may vary over time as the mobile wireless devices 250 move within the location.

In addition, devices that do not support wireless communications (e.g., desktop computer) or devices that support both wired and wireless communications (e.g., entertainment system, printer) may connect to the Wi-Fi network 150 via a wired connection. The wired connection may be to an access point that supports both wired and wireless communications (e.g., router 220) or to an access point that simply supports wired communications.

The Wi-Fi network 150 may be configured in such a fashion that the router 220 and the access points 230 have the same service set identifier (SSID) and password so that once a wireless device 240, 250 connects to the network 150 via any access point it can be connected the network 150 via any other access point without having to select another SSID or enter another password. Each access point within the Wi-Fi network 150 may have a unique basic service set identifier (BSSID) that it utilized by the network 150 to track activity associated with the access point (which may be referred to as a BSS). The BSSID for an access point (BSS) may be the media access control (MAC) address of the access point. If the access point has two radios (supports two frequency bands), the access point may have two BSSID's (one for each frequency). The BSSID's for the different radios may be based on the MAC address for the access point.

SUMMARY

A method for preventing a wireless device from rejecting BSS transition management (BTM) steering in a wireless network. The method includes preparing a list of network-preferred access points for the wireless device to connect to the wireless network. A modified list is created by adding at least one client-preferred access point for the wireless device to the list of network-preferred access points. A BTM steering is prepared message utilizing the modified list. The wireless device is blacklisted from connecting to the at least one client-preferred access point. The BTM steering message is sent to the wireless device.

A device for preventing a wireless device from rejecting BSS transition management (BTM) steering in a wireless network. The device includes a wired interface to communicate with one or more wireless access points associated with the wireless network; a processor communicatively coupled to a memory for storing network configuration information and network connectivity information; and a computer-readable storage medium to store instructions. When executed by the processor the instructions cause the processor to: prepare a list of network-preferred access points for the wireless device to connect to the wireless network; create a modified list by adding at least one client-preferred access point for the wireless device to the list of network-preferred access points; instruct a current access point to prepare a BTM steering message utilizing the modified list and to send the BTM steering message to the wireless device; and blacklist the wireless device from connecting to the at least one client-preferred access point.

A wireless network includes a plurality of access points to enable wireless devices to connect thereto and a network controller to control operation of the wireless network. The network controller prevents a wireless device from rejecting BSS transition management (BTM) steering by preparing a list of network-preferred access points for the wireless device to connect to the wireless network; creating a modified list by adding at least one client-preferred access point for the wireless device to the list of network-preferred access points; instructing a current access point to prepare a BTM steering message utilizing the modified list and send the BTM steering message to the wireless device; and blacklisting the wireless device from connecting to the at least one client-preferred access point.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

The network 150 may include a network controller that establishes the configuration of the network and tracks parameters associated therewith. The network controller may, for example, be a wireless network controller for a multiple access point network or "mesh" network, such as a Wi-Fi certified EasyMesh™ network controller. Conventional Wi-Fi certified EasyMesh™ network technology provides mesh networks that are easy to install and use, self-adapting, and that feature multi-vendor interoperability. Examples of the multiple access point network include home and small office Wi-Fi networks with a network controller to manage the network, which consists of the controller plus additional access points (APs). One or more controllers that manage and coordinate activity among the APs ensure that each AP does not interfere with the other.

Referring to FIG. 2, the network controller may track connectivity of the wireless devices 240, 250 to each of the access points 200, 230 in the network 150 and the bandwidth being utilized by the wireless devices 240, 250 connected thereto. The network controller may be capable of determining if certain access points 200, 230 or frequency bands are getting congested based on the number of wireless devices 240, 250 connected thereto and the activities being performed thereon and may take action to steer the traffic based thereon. The steering may be selected to maintain a quality of experience (QoE) for the various wireless devices connected to the network.

The network controller may also track different activities about the network 150 and the devices 240, 250 connected thereto and may process those activities to define trends thereabout. The network controller may utilize the trends to predict activities and make proactive steering decisions based thereon. The network controller may be, for example, established in an access point.

The network controller may implement the steering of wireless devices in one of two typical methods. A first method entails the network controller blacklisting the wireless device on one or more APs that the network controller determines the wireless device should not connect to, in order to steer the wireless device to a preferred AP or one of a few preferred APs. This method may cause the wireless device to lose connectivity with the current AP to which it is connected, and to reinitiate a process for connecting to the network and a new AP. This process may not be efficient, as it requires an existing connection between the wireless device and wireless network to be broken and then reestablished.

A second method for steering wireless devices includes sending BSS transition management (BTM) frames from a current AP to the wireless device where the BTM frames define a preferred AP, or provide a list of one or more possible preferred APs, to which the network controller attempts to steer the wireless device. It should be noted that the use of BTM frames is a much cleaner method to perform steering, as it does not require the wireless device to be disconnected from the wireless network and then to reconnect to the network at a different AP from which the wireless device is not blacklisted.

Figure 3:
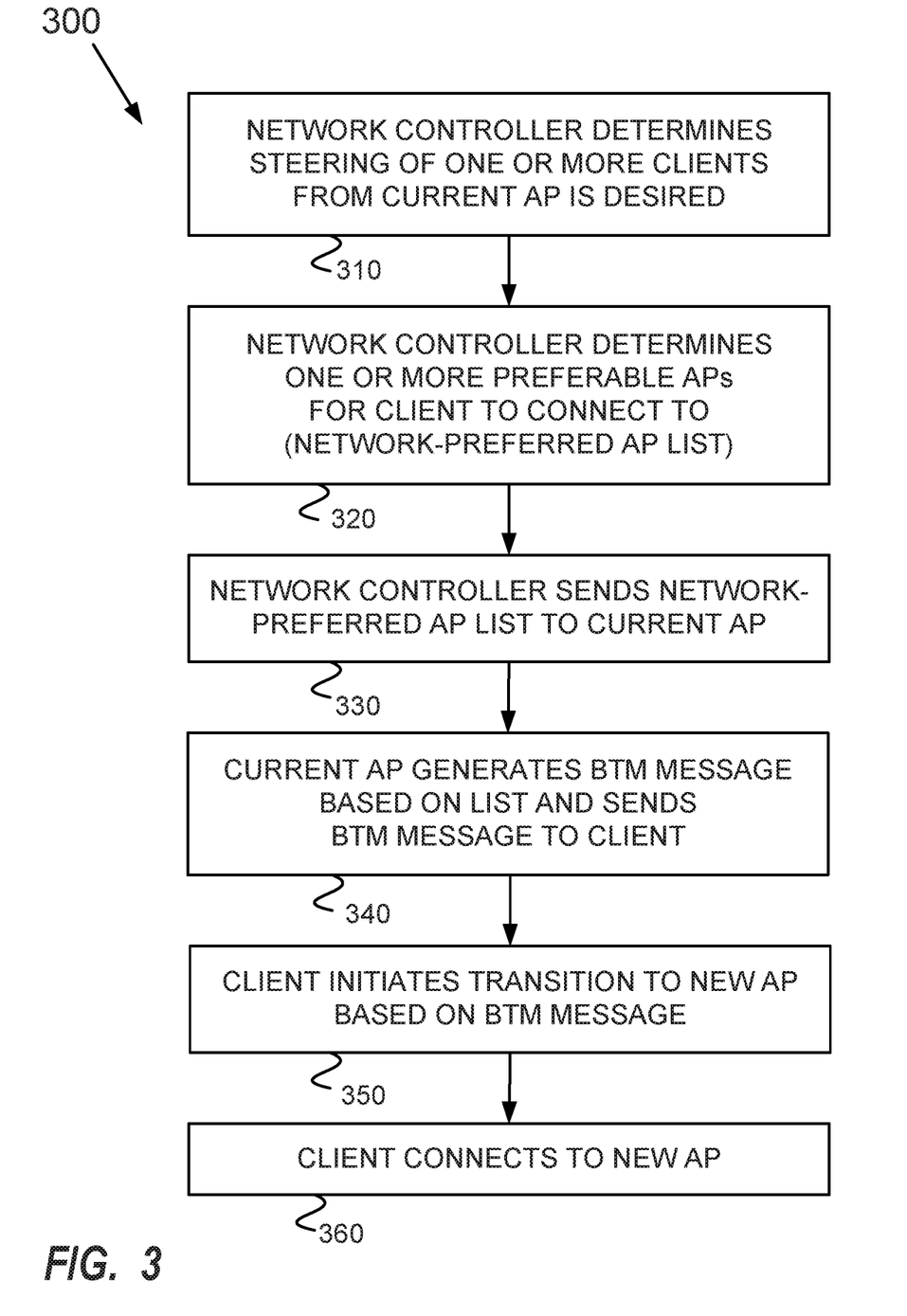
FIG. 3 illustrates an example process flow for BSS transition management (BTM) steering that entails utilizing BTM frames to steer a wireless device to a new AP, according to one embodiment.

FIG. 3 illustrates an example process flow 300 for BTM steering (utilizing BTM frames to steer wireless devices to a new AP). Initially the network controller determines that one or more wireless devices (clients) should be steered, for transitioning each client away from a current AP to which the client is connected 310. The network controller determines one or more preferable APs for the wireless device (client) to connect to the wireless network, and generates a network-preferred AP list 320. The network controller then provides the current AP with the network-preferred AP list 330. The current AP generates a BTM message (BTM steering frames) based on the network-preferred AP list and sends the BTM message to the wireless device 340. The wireless device initiates a transition to a new AP based on the BTM message 350. The wireless device may select which AP it will connect to, by selecting from the one or more APs defined in the BTM message. The wireless device then transitions away from the current AP by connecting to the selected AP 360.

The method 300 is in no way intended to be limited to the illustrated processes. Rather, additional processes can be added, processes can be combined, processes can be deleted, processes can be modified and/or the order of the processes can be modified without departing from the current scope. The method 300, or portions thereof, may be performed by a processor executing instructions stored on a computer readable storage medium.

The wireless device may have preferred APs that it selects for connecting to the wireless network. For some wireless devices, if the BTM message does not include any of the wireless device's preferred APs, the wireless device may reject the BTM steering message. That is, some wireless devices have restrictions on how BTM steering is implemented. When rejecting the BTM steering message the wireless device may provide the AP with a list of one or more of its preferred APs (a client-preferred AP list) for connecting to the wireless network. The AP may provide the client-preferred AP list it receives as part of the rejection to the network controller.

The wireless device need not wait for a rejection of a BTM steering message to provide the client-preferred AP list. Rather, the wireless device may provide the current AP the client-preferred AP list when it identifies to the current AP that it supports BTM steering. The wireless device can provide the client-preferred AP list within a BTM query frame it sends to the AP. According to one embodiment, the wireless device may provide the client-preferred AP list to the current AP when the wireless device updates the list (e.g., add AP, remove AP). The AP may provide the client-preferred AP list it receives as part of a BTM query frame to the network controller.

If the wireless device rejects the BTM messages, the wireless device will not be steered to a new AP. The network controller has better knowledge about the networking conditions than the wireless device; therefore, steering according to the network-preferred AP list is preferable over allowing the wireless device to rely upon its client-preferred AP list. Accordingly, it would be preferable to proceed with the steering suggested by the network controller. One option is to resort to blacklist steering to force the wireless device to be steered to the network-preferred AP (or one of the preferred APs). However, as this entails blacklisting all APs except the network-preferred AP(s), this is not the most desirable option. Rather, a method for working around such a BTM steering error is preferred.

One way to work around this error would be to include at least one of the client-preferred APs in the BTM message to prevent the rejection of the BTM message. However, if one or more client-preferred APs are included in the BTM message the client is likely to be steered to one of those APs rather than one of the network-preferred APs. The network could temporarily blacklist the client-preferred AP(s) to prevent the steering of the client to the client-preferred AP.

Such a method could be implemented proactively (before a rejection is received) or reactively (only after a rejection is received). If the method is done proactively, it may be done for clients that have been previously flagged for issuing such rejections. Alternatively, the method could be implemented for all wireless devices that support BTM steering. However, doing for all wireless devices may not be an efficient use of resources.

Figure 4:
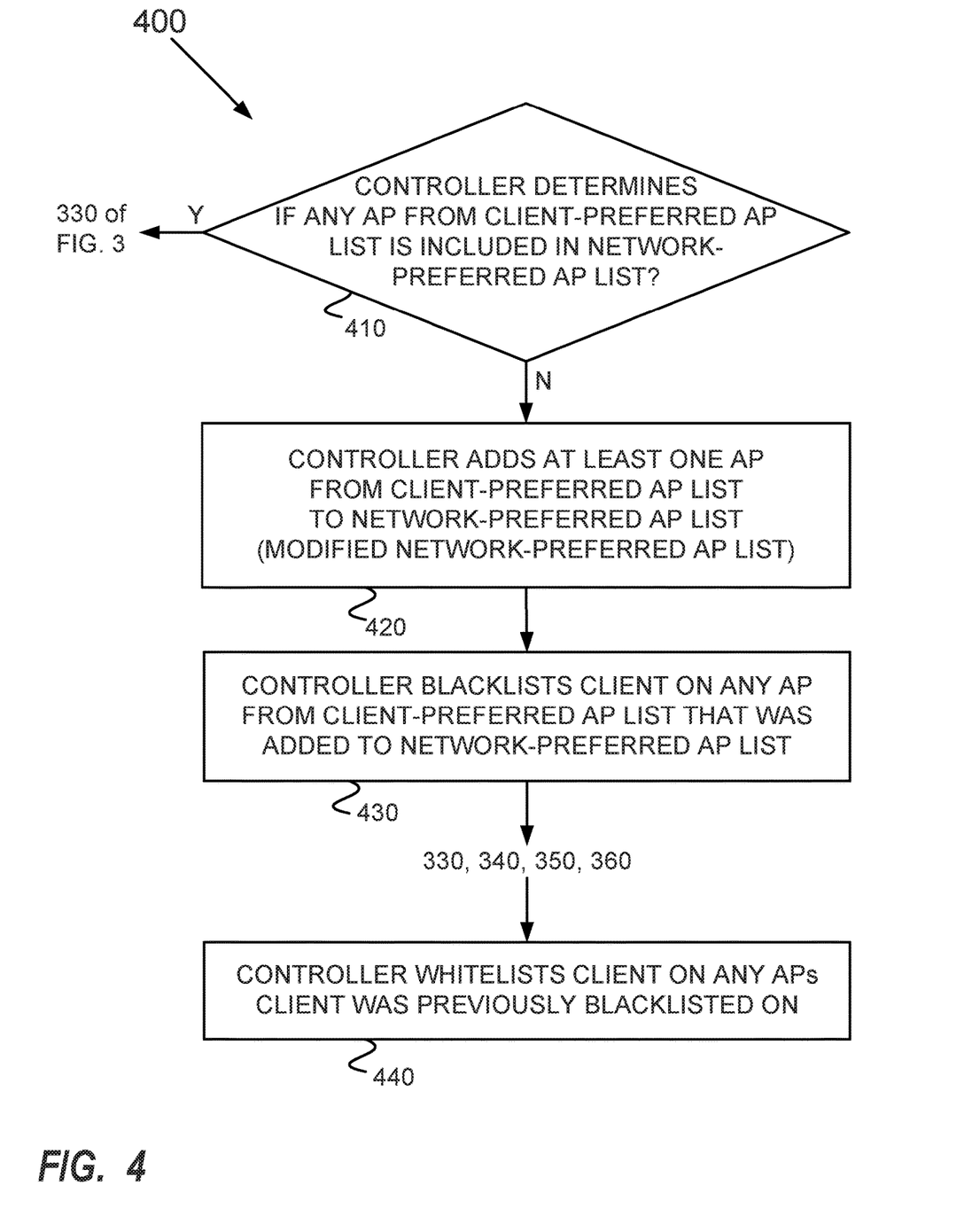
FIG. 4 illustrates an example process flow for proactively preventing the rejection of BTM steering messages by a wireless device, according to one embodiment.

FIG. 4 illustrates an example process flow 400 for proactively preventing the rejection of BTM steering messages by a wireless device. The method may start after the network controller determines steering of a client is desired (illustrated as 310 in FIG. 3), the network controller generates the network-preferred AP list (illustrated as 320 in FIG. 3) and the network controller determines that a client-preferred AP list is available (not illustrated). The network controller then makes a determination if any of clients preferred APs are included in the network-preferred AP list 410. If one or more client-preferred APs are included (410 Yes), the method would continue to process 330 of FIG. 3 as a rejection would not be received in this case.

If no client-preferred APs are included (410 No), then the network controller adds at least one AP from the client-preferred list to the network-preferred list (generates a modified network-preferred AP list) 420. The network controller then blacklists the client on any AP from the clients preferred AP list that was added to the network-preferred AP list 430. The network controller then provides the current AP with the modified network-preferred AP list (which includes the at least one client-preferred AP) 330. The current AP generates and sends a BTM message to the client 340.

The client initiates a transition to a new AP (which likely will include unsuccessfully trying to transition to the at least one AP from the client-preferred AP list which has been blacklisted) 350. The client eventually connects to a new AP (one from the network-preferred AP list) 360. After the client is transitioned to the new AP, the network controller whitelists the client for connecting to any of the APs from which the client was previously blacklisted 440.

The method 400 is in no way intended to be limited to the illustrated processes. Rather, additional processes can be added, processes can be combined, processes can be deleted, processes can be modified and/or the order of the processes can be modified without departing from the current scope. The method 400, or portions thereof, may be performed by a processor executing instructions stored on a computer readable storage medium.

Figure 5:
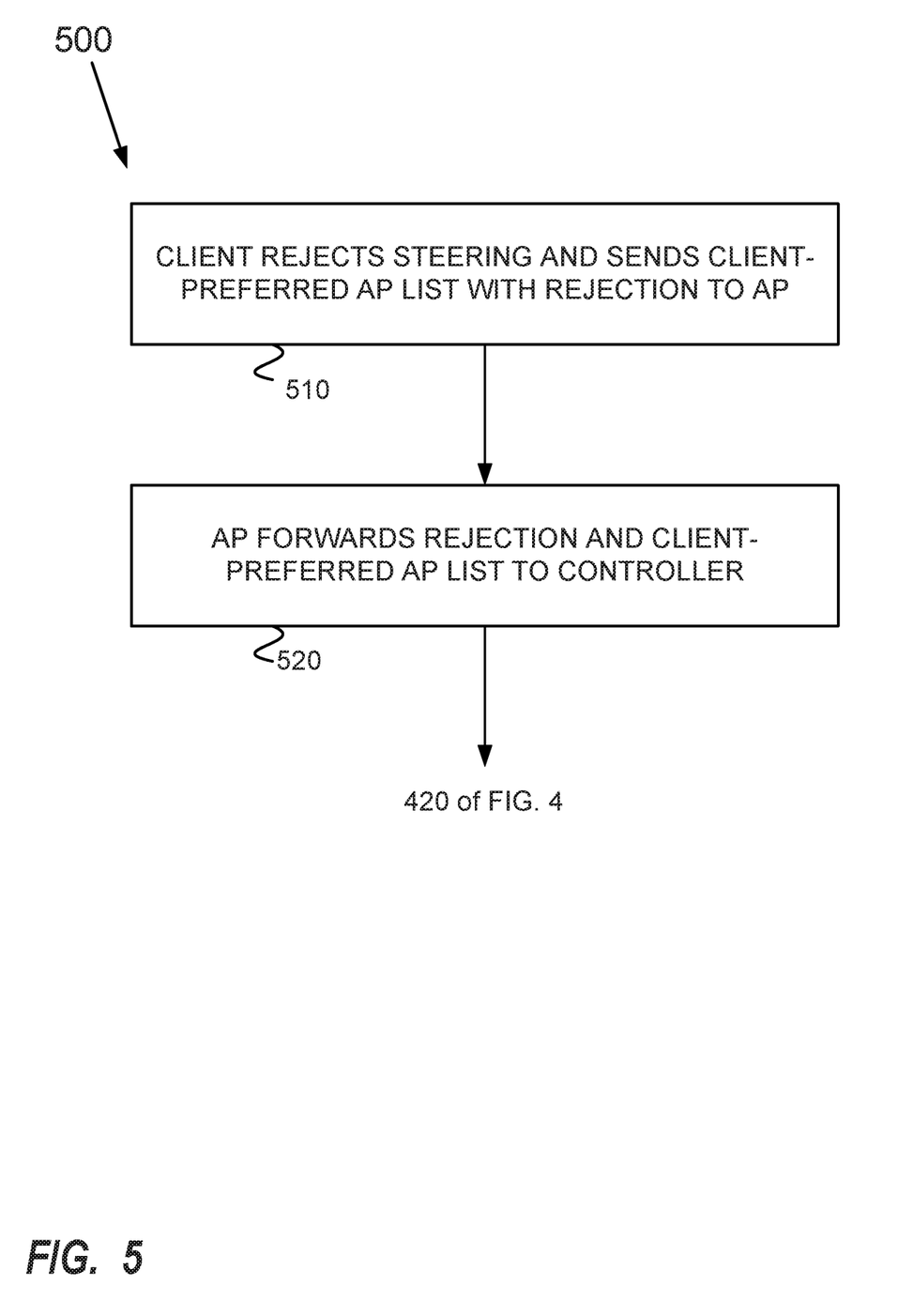
FIG. 5 illustrates an example process flow for retroactively responding to the rejection of a BTM steering message by a wireless device, according to one embodiment.

FIG. 5 illustrates an example process flow 500 for retroactively responding to the rejection of a BTM steering message by a wireless device. This method may also be implemented if the proactive implementation (method 400) is not authorized or supported, as well as if proactive implementation was authorized but the network controller determined that a client-preferred AP list was not available. The method may start after the network controller determines steering of a client is desired (illustrated as 310 in FIG. 3), the network controller generates the network-preferred AP list for the client (illustrated as 320 in FIG. 3), the network controller provides the current AP with the network-preferred AP list 330, and the current AP generates and sends a BTM message to the client 340.

If the BTM message did not include any of the client-preferred APs, the client may reject the BTM message and provide a list of client-preferred APs 510 to the current AP. The current AP may provide the rejection and the client-preferred AP list to the network controller 520. The method may then continue to process 420 of FIG. 4.

The method 500 is in no way intended to be limited to the illustrated processes. Rather, additional processes can be added, processes can be combined, processes can be deleted, processes can be modified and/or the order of the processes can be modified without departing from the current scope. The method 500, or portions thereof, may in some embodiments be performed by a processor executing instructions stored on a computer readable storage medium.

It is possible that the methods 400 or 500 can result in a client not being connected to the network because it has been removed (e.g., steered or transitioned away) from its current AP and has not yet been connected to a new AP because of the blacklisting of one or more of the client-preferred APs. As a safeguard for a client being disconnected for too long of a period of time, the network controller may monitor the time a client has been disconnected from the network. If the time exceeds a predetermined amount of time (e.g., one or more seconds, or in some embodiments an amount less than one second), the network controller may whitelist the client for connecting to all APs to ensure the client reconnects to the network. Alternatively, the network controller may whitelist the client for connecting to one or more of the client-preferred APs (e.g., the one or more client-preferred APs that were previously blacklisted). Once the client is reconnected, the network controller may attempt steering again after some period of time.

Figure 6:
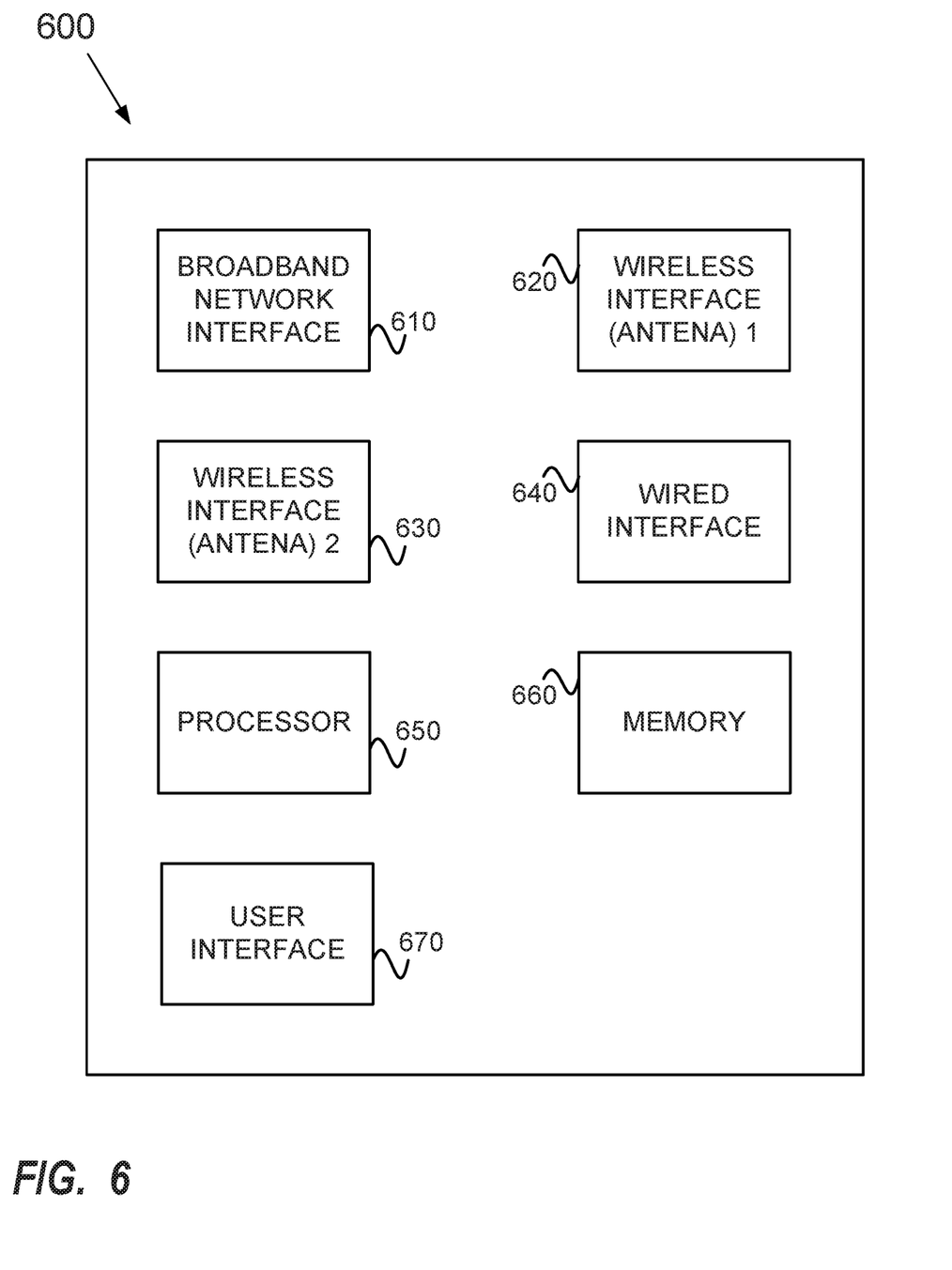
FIG. 6 illustrates an example high level functional diagram of a main access point (gateway) capable of acting as a network controller for the Wi-Fi network, according to one embodiment.

FIG. 6 illustrates an example high level functional diagram of an access point (e.g., main access point, gateway) 600 capable of acting as a network controller for the Wi-Fi network. The gateway 600 may include a broadband network interface 610, a first Wi-Fi interface (antenna) 620, a second Wi-Fi interface (antenna) 630, a wired interface 640, a processor 650, memory 660 and a user interface 670. Other access points (e.g., network extenders) may have similar functional diagrams, but would not need the broadband network interface 610. In addition, other access points may not include the wired interface 640 and may not include multiple Wi-Fi interfaces but rather may be limited to operating at a single Wi-Fi frequency.

The broadband network interface 610 is to provide connectivity to and communications with a broadband network 140. The network interface 610 may include a connector, for example, a coaxial connector for receiving a coaxial cable and associated protocols for providing the necessary communications with the broadband network 140 (e.g., receiving data from and transmitting data to). The broadband network 140 provides access to external content and external system including the Internet.

The first and second Wi-Fi interfaces (antennas) 620, 630 are to provide Wi-Fi communications between the gateway 600 and wireless devices (establish Wi-Fi networks). The first Wi-Fi interface 620 may be to establish a Wi-Fi network operating at a first frequency (e.g., 5 GHz network pursuant to IEEE 802.11a) and the second Wi-Fi interface 630 may be to establish a Wi-Fi network operating at a second frequency (e.g., 2.4 GHz network pursuant to IEEE 802.11b,g). According to one embodiment, it is possible that a single chip includes multiple antennas and can provide communications at different frequencies (e.g., 2.4 and 5 GHz network pursuant to IEEE 802.11n). The wireless devices may utilize the gateway 600 to communicate with other wireless devices within the location or may use it as an access point to connect to the Internet via the broadband network 140.

The wired interface 640 is to provide wired communications between the gateway 600 and other devices. The other devices may be computing devices using the gateway 600 to communicate with wireless devices within the location or access the Internet via the broadband network 140. The other devices may be other access points (e.g., network extenders) that extend the range of the wireless network within the location. The wired interface 640 may include a connector (e.g., coaxial, Ethernet, USB) to receive an appropriate cable and associated protocols for receiving and transmitting data thereover.

The processor 650 is to control the operation of the gateway 600. The processor 650 is to execute computer-executable instructions (e.g., software, apps). The computer executable instructions, when executed, may cause the processor 650 to control the operations of the gateway 600 and perform various functions including, but not limited to, network configuration, network and device parameter definition (e.g., capability of access points, priority devices, priority services), activity monitoring and analysis (e.g., statistics, analytics) and device and network trend generation. Some of the functions performed by the processor 650 are based on data that is collected about the network and the devices connected thereto.

In addition to controlling the operation of the gateway 600, the processor 650 may also control the operation of the network (act as a network controller). As noted earlier, the network controller may be a Wi-Fi certified EasyMesh™ network controller. That is, the processor 650 when executing the computer executable instructions related to the network controller may direct the activities of the other access points in the network including connectivity of wireless devices thereto. The processor 650 when executing the instructions may perform appropriate portions of the operations 300-500.

The memory 660 is to store the computer-executable instructions and/or other data. The other data may include, for example, configuration data (e.g., wireless network topology), connectivity data (e.g., wireless devices actively connected to the wireless network, signal strength of connected devices, congestion of access points), and activity data (e.g., bandwidth utilized by wireless device, tasks being performed). The gateway 600 may receive data related to what is connected to the other access points from the other access points. The data may be received from the access points, for example, when wireless devices connect or disconnect from the access points, when the wireless devices communicate with the broadband network 140 which requires communications with the gateway 600, at defined intervals (e.g., every few seconds) and/or when required for any reason.

The memory 660 may be located on the processor 650 and/or may be separate from the processor 650. The memory 660 storing the computer-executable instructions may be computer-readable memory so that the processor 650 can read and execute the computer-executable instructions.

The memory 660 may be supplemented with external memory that may be located in other access points, in a STB or any other device having storage that is connected to the wireless network and/or in the cloud.

The user interface 670 may include, for example, lights to provide a user an indication about the operational status thereof. The user interface 670 may also include, for example, switches, buttons or the like to enable the user to, for example, power on/off and/or reset the gateway 600.

As described above, the gateway 600 may provide the network controller functionality and have information about the connectivity of wireless devices to different access points in the network, know about the capabilities of the access points and may be capable of predicting future activities of the network. As such, the gateway 600 acting as the network controller is ideally suited to make a determination about when steering for a wireless device is desired and which access points are best for connectivity of the wireless device (network-preferred AP list).

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the preceding embodiments may be implemented using program instructions, an operating system (such as a driver for an interface or device), or in firmware. Alternatively, or additionally, at least some of the operations in the communication technique may be implemented in a physical layer, such as hardware.

In the preceding description, we refer to "some embodiments." Note that "embodiments" or "some embodiments" describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

We claim:

1. A method for preventing a wireless device from rejecting BSS transition management (BTM) steering in a wireless network, the method comprising:
   preparing a list of network-preferred access points in the wireless network for the wireless device to connect to the wireless network;
   creating a modified list by adding at least one client-preferred access point for the wireless device to the list of network-preferred access points;
   preparing a BTM steering message utilizing the modified list;
   blacklisting the wireless device from connecting to the at least one client-preferred access point; and
   sending the BTM steering message to the wireless device.

2. The method of claim 1, further comprising:
   determining that the wireless device should be steered away from a current access point of the wireless device.

3. The method of claim 1, further comprising:
   determining that the list of network-preferred access points does not include the at least one client-preferred access point.

4. The method of claim 3, further comprising:
   determining that the at least one client-preferred access point is known.

5. The method of claim 1, further comprising:
   receiving a rejection of the BTM steering message from the wireless device, wherein the rejection is received because the BTM steering message included no client-preferred access points; and
   wherein the creating the modified list is performed after the rejection is received.

6. The method of claim 5, wherein:
   the rejection includes a list of client-preferred access points; and
   creating the modified list comprises:
      adding, from the list of client-preferred access points included in the rejection, the at least one client-preferred access point.

7. The method of claim 1, further comprising:
   monitoring connectivity of the wireless device to determine whether the BTM steering message resulted in a successful BTM steering.

8. The method of claim 7, further comprising:
whitelisting the wireless device for connecting to the at least one client-preferred access point from which it was previously blacklisted subsequent to the successful BTM steering.

9. The method of claim 1, further comprising:
tracking a length of time that the wireless device is disconnected from the wireless network.

10. The method of claim 9, further comprising:
when the length of time is longer than a defined period of time, whitelisting the wireless device for connecting to all the access points in the wireless network.

11. The method of claim 9, further comprising, when the length of time is longer than a defined period of time, whitelisting the wireless device for connecting to the at least one client-preferred access point.

12. A device for preventing a wireless device from rejecting BSS transition management (BTM) steering in a wireless network, the device comprising:
a wired interface to communicate with one or more wireless access points associated with the wireless network;
a processor communicatively coupled to a memory for storing network configuration information and network connectivity information; and
a computer-readable storage medium storing instructions that when executed by the processor cause the processor to:
prepare a list of network-preferred access points in the wireless network for the wireless device to connect to the wireless network;
create a modified list by adding at least one client-preferred access point for the wireless device to the list of network-preferred access points;
instruct a current access point to prepare a BTM steering message utilizing the modified list and to send the BTM steering message to the wireless device; and
blacklist the wireless device from connecting to the at least one client-preferred access point.

13. The device of claim 12, wherein when the instructions are executed they cause the processor to:
receive a rejection of the BTM steering message from the wireless device, wherein the rejection is received because no client-preferred access points were included in the BTM steering message, and
create the modified list after the rejection is received.

14. The device of claim 12, wherein when the instructions are executed they cause the processor to:
monitor connectivity of the wireless device to determine whether the BTM steering message resulted in a successful BTM steering; and
whitelist the wireless device for connecting to the at least one client-preferred access point from which it was previously blacklisted subsequent to the successful BTM steering.

15. The device of claim 12, wherein when the instructions are executed they cause the processor to:
track a length of time the wireless device is disconnected from the network; and
when the length of time is longer than a defined period of time, whitelist the wireless device for connecting to either of:
all the access points in the network, or
the at least one client-preferred access point.

16. A wireless network comprising:
a plurality of access points to enable wireless devices to connect to the wireless network; and
a network controller to control operation of the wireless network including preventing a wireless device from rejecting BSS transition management (BTM) steering by:
preparing a list of network-preferred access points in the wireless network for the wireless device to connect to the wireless network;
creating a modified list by adding at least one client-preferred access point for the wireless device to the list of network-preferred access points;
instructing a current access point to prepare a BTM steering message utilizing the modified list and to send the BTM steering message to the wireless device; and
blacklisting the wireless device from connecting to the at least one client-preferred access point.

17. The wireless network of claim 16, wherein the network controller further prevents the wireless device from rejecting BTM steering by:
receiving a rejection of the BTM steering message from the wireless device, wherein the rejection is received because no client-preferred access points were included in the BTM steering message, and
creating the modified list after the rejection is received.

18. The wireless network of claim 16, wherein the network controller further prevents the wireless device from rejecting BTM steering by:
monitoring connectivity of the wireless device to determine whether the BTM steering message resulted in a successful BTM steering; and
whitelisting the wireless device for connecting to the at least one client-preferred access point from which it was previously blacklisted subsequent to the successful BTM steering.

19. The wireless network of claim 16, wherein the network controller further prevents the wireless device from rejecting BTM steering by:
tracking a length of time the wireless device is disconnected from the network; and
when the length of time is longer than a defined period of time, whitelisting the wireless device for connecting to either of:
all the access points in the network, or
the at least one client-preferred access point.

20. The wireless network of claim 16, wherein one of the plurality of access points is a network gateway and the network controller operates in the network gateway.

* * * * *